W. P. NEUBERT.
APPARATUS FOR GOVERNING THE PASSAGE OF CARS OR VEHICLES ALONG A RAILWAY
AND THE CONTROL THEREOF.
APPLICATION FILED JAN. 17, 1911.

1,001,068.

Patented Aug. 22, 1911.

3 SHEETS—SHEET 1.

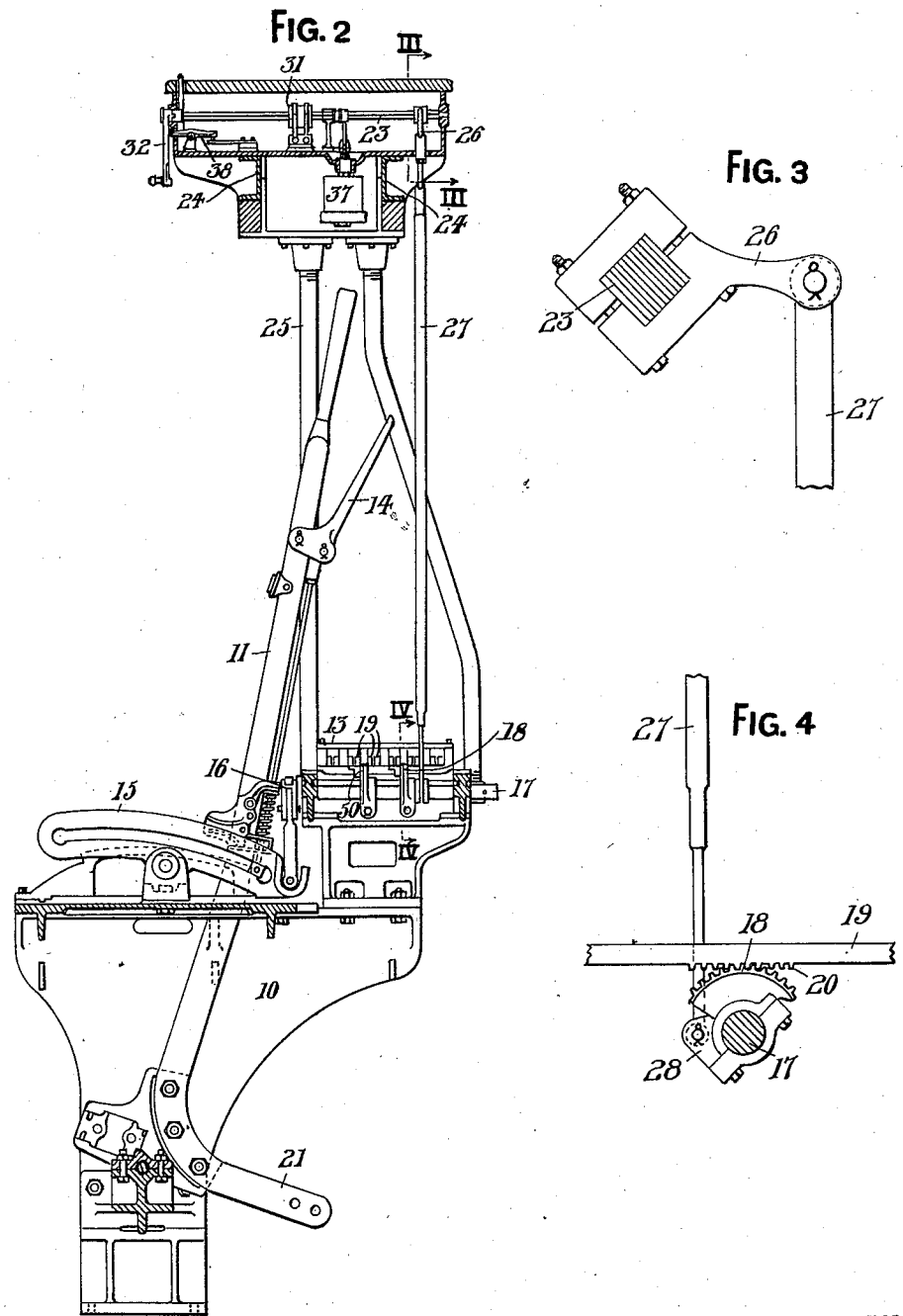

W. P. NEUBERT.
APPARATUS FOR GOVERNING THE PASSAGE OF CARS OR VEHICLES ALONG A RAILWAY
AND THE CONTROL THEREOF.
APPLICATION FILED JAN. 17, 1911.

1,001,068.

Patented Aug. 22, 1911.

3 SHEETS—SHEET 3.

WITNESSES:

INVENTOR.
BY
ATTORNEY.

UNITED STATES PATENT OFFICE.

WALTER P. NEUBERT, OF SWISSVALE BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

APPARATUS FOR GOVERNING THE PASSAGE OF CARS OR VEHICLES ALONG A RAILWAY AND THE CONTROL THEREOF.

1,001,068. Specification of Letters Patent. Patented Aug. 22, 1911.

Application filed January 17, 1911. Serial No. 603,107.

*To all whom it may concern:*

Be it known that I, WALTER P. NEUBERT, a citizen of the United States, residing in the borough of Swissvale, in the county of Allegheny and State of Pennsylvania, have invented certain new and useful Improvements in Apparatus for Governing the Passage of Cars or Vehicles Along a Railway and the Control Thereof, of which the following is a specification.

My invention relates to machines for the control of railway traffic-governing apparatus, and more particularly to machines of this character comprising levers for the mechanical control of portions of such apparatus and levers for the electrical control of other portions of such apparatus.

I will describe one form of controlling machine embodying my invention and then point out the novel features thereof in claims.

Figure 1:
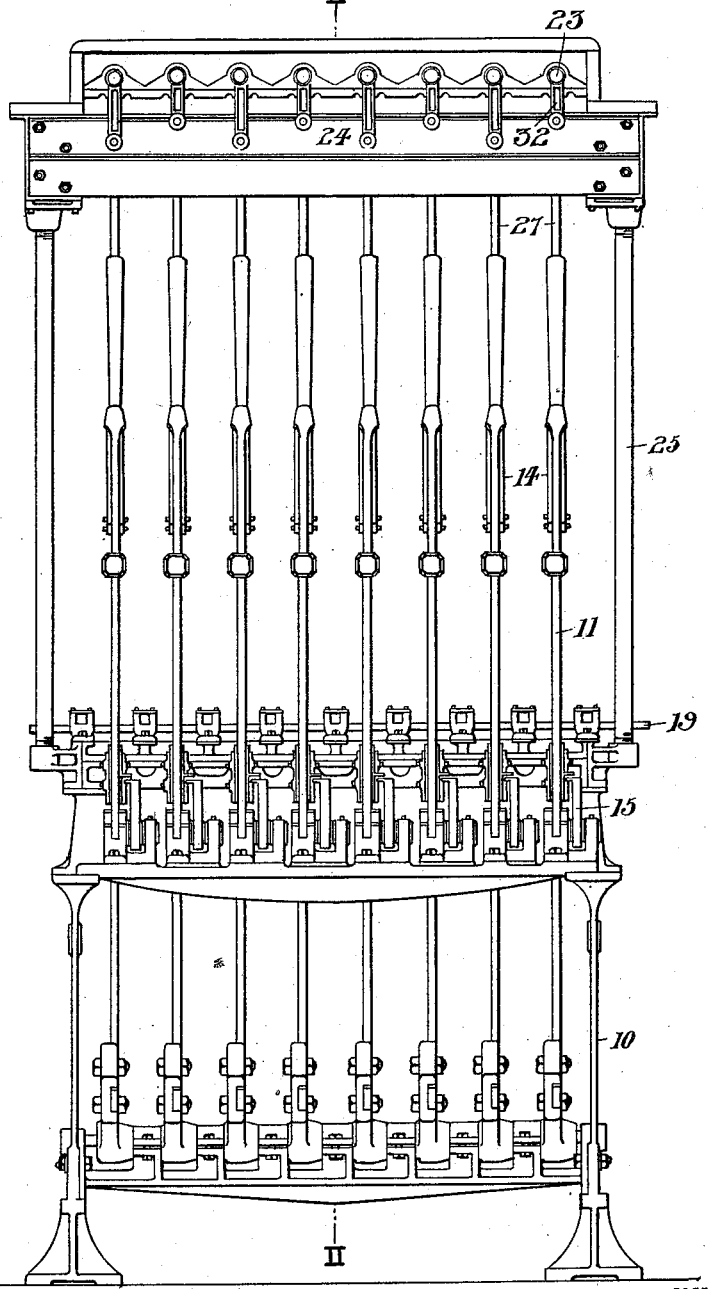
Figure 5:
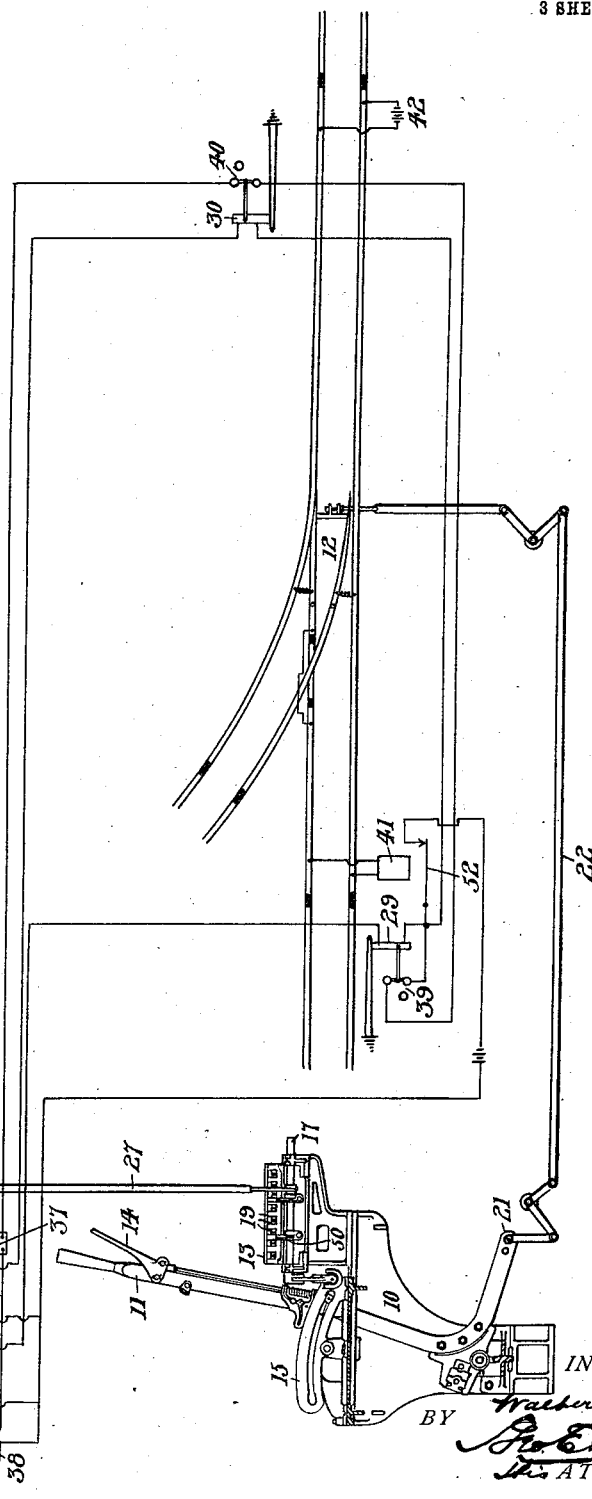

In the accompanying drawings, Figure 1 is a view showing in front elevation a controlling machine embodying my invention. Fig. 2 is a sectional view on the line II—II of Fig. 1. Fig. 3 is a view on the line III—III of Fig. 2, looking in the direction of the arrow, and Fig. 4 is a sectional view on the line IV—IV of Fig. 2, looking in the direction of the arrow. Fig. 5 is a diagrammatic view showing two forms of railway traffic-governing apparatus controlled by a machine embodying my invention.

Similar reference characters refer to similar parts throughout the several views.

One feature of a machine embodying my invention is the economy of space required, owing to the compact arrangement of the mechanical and electrical levers. In the practice of my invention I employ small electric controlling levers which are preferably mounted above the mechanical controlling levers.

Referring now to Figs. 1 and 2, the reference character 10 designates a suitable framework in which are mounted a plurality of levers 11 adapted for the mechanical control of railway traffic-governing apparatus. 13 is an interlocking bed comprising a plurality of locking bars 19. Each lever is provided with a latch 14 by means of which the lever is held in the extreme positions of its stroke, and this latch operates a rocking link 15 which is connected at one end with a crank 16 secured to a rotating shaft 17. This shaft operatively engages one of the locking bars 19 in a suitable manner, as for example by means of a segmental gear 50 which engages with a rack in the locking bar 19. The movements of the latch 14 are thus employed to give a reciprocating movement to the corresponding locking bar 19.

The controlling machine as thus far described is a form of mechanical interlocking machine well known in the art and requiring no further explanation.

23, 23, etc., designate rotating levers adapted for the electric control of railway traffic-governing apparatus. These levers are carried in a superstructure mounted upon the frame 10; as here shown this superstructure comprises horizontal beams 24 carried by pipe supports 25 attached to the frame 10. Each of these levers may be of a well-known type of electric controlling lever, such for example as the type shown and described in United States Letters Patent No. 551,755 granted to J. P. Coleman on December 24th, 1895. In my invention each of these electric controlling levers is operatively connected with one of the locking bars 19 in the locking bed 13. As here shown this connection comprises a crank 26 secured to the shaft of the lever 23 and connected with a rod 27 (see Fig. 3) which rod is in turn connected with a crank 28 mounted to rotate freely on one of the shafts 17 (see Fig. 4.) This crank 28 carries a segmental pinion 18 which engages a rack 20 on the locking bar 19.

It will be evident from the foregoing description that any desired arrangement of interlocking may be secured between the mechanical levers 11 and the electric levers 23, as well as between the various mechanical levers and between the various electric levers.

The electric levers 23 may be employed to control any desired forms of railway traffic-governing devices, such for example as railway signals, as illustrated in Fig. 5. Referring now to this figure, 12 designates a railway switch the movable rails of which are connected with the tail end 21 of the mechanical lever 11 through the medium of cranks and rods 22. 29 and 30 designate railway signals governing traffic in opposite directions, the circuits for which signals are controlled by means of a circuit controller 31 operated by the electric lever 23. Various types of controlling apparatus and circuits for such signals are well known in the art, and as here shown may be briefly described as follows: The normal position of the lever 23 is with its handle 32 in the middle position of its stroke, as shown in Fig. 1. When this handle is rotated toward the right, a contact band 33 on the circuit controller 31 makes contact with two fingers 35, whereby a circuit is closed through the operating mechanism of signal 29, moving this signal to its clear position. Similarly by rotating the lever 23 toward the left, contact band 34 makes a contact with two fingers 36, thus closing a circuit which moves signal 30 to its clear position. The lever 23 is normally locked in its middle position by a locking magnet 37 in a usual and well known manner, the energizing circuit for this magnet being controlled by a latch circuit controller 38 and by circuit controllers 39 and 40 operated respectively by the signals 29 and 30. The latch circuit controller 38 is operated by the rotation of the handle 32 on its pivot as shown and described in the above mentioned Patent No. 551,755. 41 designates a track relay energized by a track battery 42, the armature 52 of which relay controls the lever 23 and the circuits controlled thereby. Thus, when the track section governed by the relay 41 is occupied by a car or train, the energizing circuit for the locking magnet 37, and the circuits for signals 29 and 30, are all held open by the armature 52.

Although I have here shown two railway signals controlled by an electric lever 23, I do not desire to limit myself to this specific arrangement, for the reason that such a lever may be employed to control any desired number of signals, or any other desired railway traffic-governing apparatus by changes which are well understood by those skilled in the art.

Having thus described my invention, what I claim is:

1. In combination with apparatus for governing the passage of cars or vehicles along a railway, a mechanism for the control thereof comprising a plurality of reciprocating levers for the mechanical control of portions of said apparatus, a locking latch for each of said levers, a rotating shaft for each of said levers which shaft is operatively connected with the latch for said lever, a mechanical interlocking device having a plurality of locking bars, means carried by each of said rotating shafts for operating one of said locking bars, a plurality of rotatable levers for the electric control of portions of said apparatus, a crank operatively connected with each electric lever, each of said cranks being mounted to rotate freely on one of the said rotating shafts, and means carried by each of said cranks for operating one of the said locking bars.

2. In an interlocking machine for the control of apparatus governing the passage of cars or vehicles along a railway, a mechanical lever, a latch for said lever, a mechanical interlocking bed comprising a plurality of locking bars one of which is positively and directly connected with said latch, a power lever, and mechanism interposed between the power lever and another of the said locking bars.

In testimony whereof I affix my signature in presence of two witnesses.

WALTER P. NEUBERT.

Witnesses:
A. L. VENCILL,
I. J. HARTER.